INVENTOR
JULES H. GUTH
LEON TUMERMAN
BY Anderson, Luedeka, Fitch, Even, & Tabin
ATTORNEYS United States Patent Office 3,546,206
Patented Dec. 8, 1970

3,546,206
METHOD OF MAKING LACTULOSE
Jules H. Guth, Mount Prospect, and Leon Tumerman, Deerfield, Ill., assignors to Kraftco Corporation, New York, N.Y., a corporation of Delaware
Filed Sept. 20, 1967, Ser. No. 669,181
Int. Cl. C13k 9/00; C07c 47/18; C13d 3/02
U.S. Cl. 260—209            7 Claims

ABSTRACT OF THE DISCLOSURE

A method for making lactulose from lactose wherein a lactose solution is maintained for a predetermined time at a predetermined temperature in the presence of an alkaline or alkaline earth aluminate.

---

Figure 1:
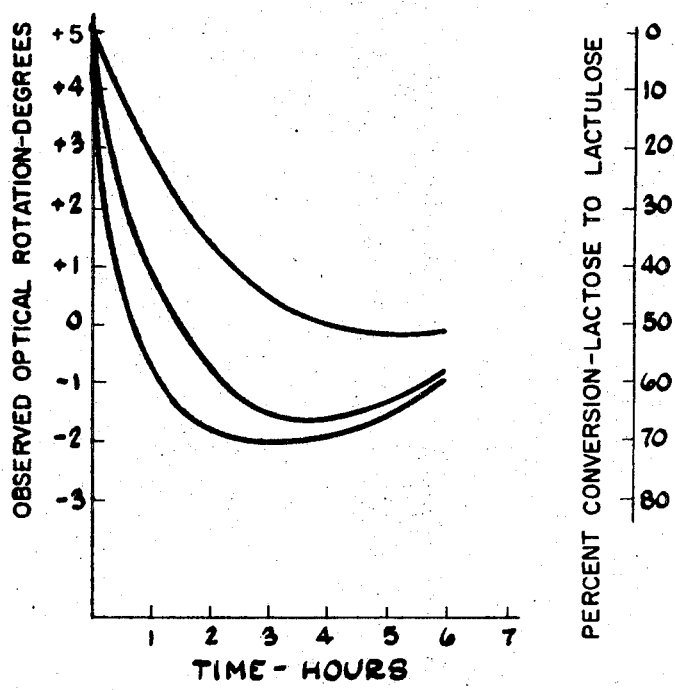

The present invention relates to a process for the production of lactulose and more particularly relates to a process for producing lactulose from lactose in high yield.

In recent years lactulose has been proposed as an additive to food to provide desired physiological benefits. Lactulose is not hydrolyzed by the lactase enzyme present in the small intestine. Therefore, it reaches the human intestine in a non-absorbed state where certain intestinal bacteria proceed to metabolize it. *Lactobacillus bifidus* and *Lactobacillus acidophilus* metabolize lactulose in the intestinal tract to provide predominantly lactic acid, thereby resulting in stools of an acid pH condition, i.e., pH 4.5 to 5.6. This acid condition of the intestinal tract thereby suppresses putrefactive bacteria which need an alkaline media for growth.

When lactulose is added to infant foods it induces a growth of substantially pure lactobacillus bifidus in the intestinal tract. *Lactobacillus bifidus* is the predominant microorganism found in the intestinal tract of breast-fed infants. When lactulose is added as a supplement to cow's milk the bifidus flora in the stool of the infant is remarkably increased. Therefore, lactulose can provide those physiological benefits from cow's milk formulas that are normally provided by breast feeding. The benefits result in better body growth and healthier babies.

The potential of lactulose as a geriatric food supplement has also been recognized. The addition of lactulose to the diet for the elderly can effectively create soft bowel movements and regularity. Lactulose also has potential therapeutic application in the treatment of constipation and other intestinal disorders, such as colitis, pruritus ani, and putrefactive toxemia.

In spite of the recognized large potential of lactulose as a food supplement, development and use of lactulose has been hindered by the high cost of lactulose produced by prior art methods. Lactulose is the keto analog of lactose. The transformation of lactose to lactulose constitutes an isomerization of the aldose sugar, lactose, through an enediol intermediate to the ketose sugar, lactulose. It has been recognized that this reaction occurs in the presence of an alkali, such as calcium hydroxide, sodium hydroxide and pohsphate buffer systems. However, such known methods for isomerization of lactose to lactulose require lengthy periods of time, i.e., several days, and provide low yields, i.e., 15 to 25 percent.

While various methods, such as those disclosed in U.S. Pat. No. 2,487,121 and German Pat. No. 1,163,307, are known which provide improved conversion of monosaccharide aldose sugars to ketose sugars, a suitable conversion method for the isomerization of disaccharide aldose sugars such as lactose, to ketose disaccharide sugars such as lactulose, is not known.

Accordingly, it is the principal object of the present invention to provide a method of manufacture of lactulose.

It is another object of the present invention to provide an improved method for conversion of lactose to lactulose.

It is a further object of the present invention to provide an improved method for the conversion of lactose to lactulose with high yields of lactulose.

Figure 2:
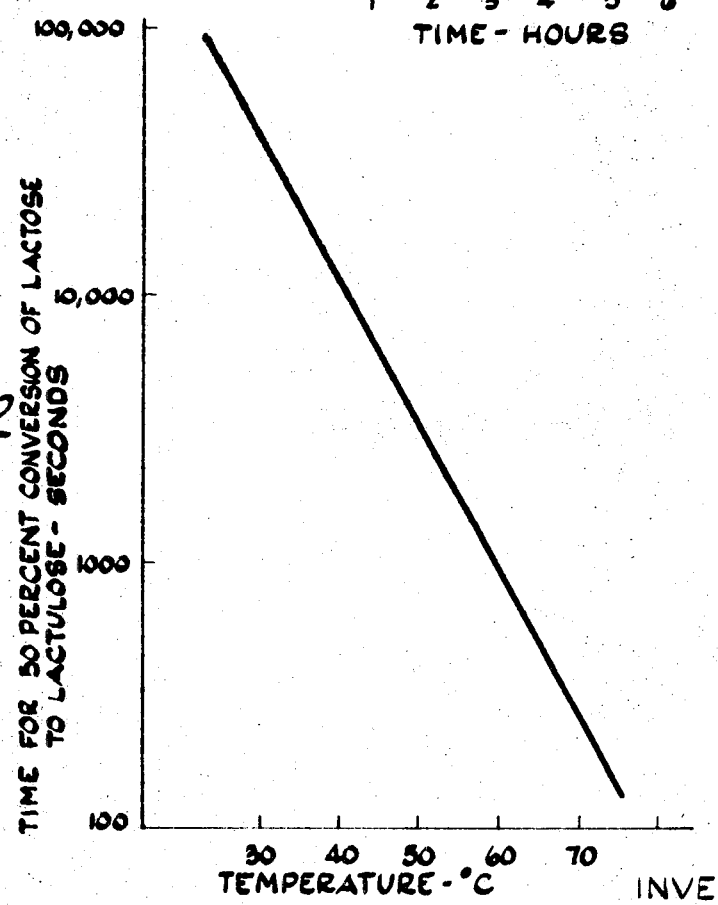

These and other objects of the present invention will become more apparent from the following detailed description and the accompanying drawings, wherein:

FIG. 1 is a graph depicting the conversion of lactose to lactulose for various times at a particular temperature and with varying concentrations of aluminate; and FIG. 2 is a graph depicting the time required to achieve a particular conversion level of lactose to lactulose for a particular aluminate level and lactose concentration at various temperatures.

Generally, in accordance with a method embodying various of the features of the present invention, lactose is converted to lactulose at levels of up to about 80 percent conversion by maintaining a lactose solution for a predetermined time in the presence of an alkali or alkaline earth aluminate. The level of conversion of lactose to lactulose is related to the concentration of the lactose solution, the level of the aluminate used, the temperature of the reaction and the time of the reaction.

More particularly, the process of the present invention begins with an aqueous solution of lactose. The concentration of the lactose solution is not critical and may be from about 5 weight percent to about 50 weight percent, although other concentrations may also be used up to the solubility limit for lactose. It has been found, however, that the reaction rate for conversion of the lactose to lactulose is dependent upon the concentration of the lactose solution. It is therefore preferred to use higher concentrations of lactose within the above indicated range, for example, from about 20 to about 30 weight percent. Higher lactose concentrations are also preferred in that less water remains to be removed after conversion of the lactose to lactulose to provide a dry lactulose powder after the reaction has been completed. In this connection, however, the level of conversion of lactose to lactulose for a given concentration of aluminate is reduced as the lactose concentration is increased. Selection of a particular lactose concentration is therefore a matter of judgment based on the indicated considerations.

In accordance with the present invention any alkaline or alkaline earth aluminate may be used to effect the conversion of lactose to lactulose. Such aluminates are easily removed from the lactulose reaction mixture by precipitation of aluminum as aluminum hydroxide. Particularly preferred aluminates are sodium aluminate or calcium aluminate. Sodium aluminate is extremely economical to use, but presents some problem in removal of the sodium ion. Calcium aluminate provides an advantage in the ease of removal of calcium ion as calcium sulfate.

The aluminate may be used at mole ratios of aluminate to lactose of from about 0.5 to about 5.0. While mole ratios of aluminate below the indicated range may also be used the level of conversion is not as high, and the time required for conversion of lactose to lactulose is substantially increased. Mole ratios of aluminate above the indicated range may also be used, but subsequent removal of the aluminate is more difficult and no appreciable increase in conversion level is provided at mole ratios of aluminate higher than about 5.0. In this connection, however, mole ratios of aluminate to lactose higher than about 5.0 may sometimes be used where a faster rate of reaction or a lower reaction temperature is desired.

For a given ratio of aluminate to lactose, the time required to reach a particular conversion level is dependent on the temperature at which the reaction is carried out. In general, it is preferred to use temperatures of from about 50° C. to about 100° C. For example, as shown in FIG. 2, when two moles of sodium aluminate are used per mole of lactose, the time required to reach a 50 percent conversion of lactose to lactulose varies from about 260 seconds at 70° C. to about 11,000 seconds at 40° C.

As indicated above, the rate of conversion and conversion level of lactose to lactulose is dependent on the level of aluminate used and the temperature of the reaction. The basic pH of the reaction mixture is, of course, also dependent on the level of aluminate used. However, the reaction is not dependent on the basic pH of the reaction mixture. For example, the use of an aluminate level of two moles per mole of lactose, where the lactose is present at a given concentration, produces a certain pH. At a particular temperature the reaction proceeds at a certain rate to provide a certain level of conversion of lactose to lactulose. Neither the rate nor the conversion level may be duplicated by using lower levels of aluminate and thereafter adjusting the pH with a different base material to that provided by the two moles of aluminate per mole of lactose.

The following examples further illustrate various features of the present invention, but are not intended to limit the scope of the invention, which is defined in the appended claims.

EXAMPLE I 105 grams of lactose monohydrate were dissolved in 500 ml. of water. 48 grams of $NaAlO_2$ was dissolved in 100 ml. of water and was then added to the lactose solution. The mixture was then diluted to one liter to provide a pH of 11.5. The reactant concentrations of 48 grams of sodium aluminate and 105 grams of lactose are equivalent to a mole ratio of 2 moles of aluminate to one mole of lactose. The mixture was then heated to 50° C. and 100 ml. aliquots were removed at periodic intervals to determine the level of conversion. The reaction was terminated after three hours by adding sufficient 30 percent HCl to lower the pH to 4.2. The pH was then raised to neutrality, i.e., 6.5 to 7.0, with ammonium hydroxide so as to completely precipitate insoluble aluminum hydroxide. The precipitate was then removed by vacuum filtration and the filtrate was analyzed for the presence of ketose sugar by chromatographic analysis. The chromatographic analysis of the filtrate confirmed that the main component of the filtrate was lactulose and not the monosaccharide ketose sugar, fructose.

The level of conversion of lactose to lactulose at various time intervals was determined by the optical rotation method. Lactose is a dextrorotatory optically active substance with a specific rotation of plus 52.5° and lactulose is a levorotatory optically active compound, with a specific rotation of —51.5°. In this method of analysis the aliquot sample which was withdrawn was treated as indicated above to recover a filtrate containing lactose and lactulose. The filtrate was diluted to 200 ml. to provide a standard volume. The diluted filtrate was used to fill a clear glass tube that is two decimeters in length. The glass tube had sight ports on each end to allow passage of light therethrough. The tube was then placed in a polarimeter and the degrees of rotation of a monochromatic light source was observed. Monochromatic light of 5890 A. was obtained from a sodium vapor light source.

As can be seen in FIG. 1, the observed rotation for pure lactose was slightly greater than five degrees for the particular conditions of Example I. At a two mole aluminate level the optical rotation changed from plus five degrees to about —1.4 degrees in about 3.5 hours. As the reaction continued past 3½ hours some reversibility was noted as the observed rotation increased from —1.5 degrees to —0.8 degree. This is attributed to decompositional changes in the sugars known to occur under hot alkaline conditions. However, under the reaction conditions of Example I, less decomposition of the sugars was evident than would be expected from known prior art alkaline treatments.

Aluminate levels of one mole per mole and three moles per mole were also used to provide the other two plots of FIG. 1. As can be seen in FIG. 1, with increasing levels of concentration of aluminate the conversion of lactose to lactulose may be increased. For a given level of aluminate, the degree of conversion can also be controlled by varying the temperature of reaction or the time of reaction or both.

EXAMPLE II

The method of Example I was used to convert the lactose contained in whey to lactulose. 600 mls. of concentrated whey containing 198 grams of lactose were mixed with 96 grams of sodium aluminate, which had been dissolved in 400 mls. of water to provide a reaction mixture having a pH of 11.5. This provided an aluminate level of two moles per mole of lactose. The mixture was heated at 50° C. for a period of 180 minutes. 65 percent of the lactose was converted to lactulose, as determined by the optical rotation method.

What is claimed is:

1. A process for the manufacture of lactulose comprising providing an aqueous solution of lactose, adding to said solution an alkali or alkaline earth aluminate to form a reaction mixture and maintaining said reaction mixture at a preselected temperature for a time sufficient to convert a desired level of lactose to lactulose.

2. The process of claim 1 wherein said aluminate is added at a mole ratio of aluminate to lactose of from about 0.5 to about 5.0.

3. The process of claim 1 wherein said temperature is from about 30° C. to about 100° C.

4. The process of claim 1 wherein said aluminate is sodium aluminate.

5. The process of claim 1 wherein said aluminate is calcium aluminate.

6. The process of claim 1 wherein said lactose is present in said aqueous solution at a level of from about 5 weight percent to about 20 weight percent.

7. The process of claim 1 wherein the aqueous solution of lactose is provided from whey.

References Cited

UNITED STATES PATENTS

| | | | |
|---|---|---|---|
| 2,354,664 | 8/1944 | Cantor et al. | 127—41UX |
| 2,487,121 | 11/1949 | Fetzer et al. | 127—30X |

FOREIGN PATENTS

| | | |
|---|---|---|
| 1,163,307 | 2/1964 | Germany. |

OTHER REFERENCES

Mendigino, "Effect . . . Sugar," J. Am. Chem. Soc. 82: 4975–79 (1960).

Clamp et al.: "Lactose," Advances in Carbohydrate Chemistry, vol. 16, pp. 188–190 (1961).

Montgomery et al.: "Relations Between Rotatory Power and Structure . . . ," J. Am. Chem. Soc., 52:2101–06 (1930).

MORRIS O. WOLK, Primary Examiner

D. G. CONLIN, Assistant Examiner

U.S. Cl. X.R.

127—30, 41, 42, 46